3,297,533
BIOLOGICALLY ACTIVE ANIMAL EXTRACTS
Albert Szent-Györgyi, Andrew F. Hegyeli, and Jane A. McLaughlin, Woods Hole, Mass., assignors to the United States of America as represented by the Secretary of Health, Education and Welfare
No Drawing. Filed July 26, 1963, Ser. No. 299,450
2 Claims. (Cl. 167—78)

This invention relates to biologically active extracts of animal tissues, glands and fluids and to methods for extracting and isolating the same. More specifically, it relates to extracts which influence cancer growth in animals and to methods of influencing tumor growth therein.

Prior investigators have subjected animal matter to a wide variety of extraction procedures and have isolated a large number of materials which exhibit biological or chemical activity. So far as is known, however, the extracts of the present invention have not been reported by others. We have reported the extraction procedure and biological activity in Proc. Nat. Acad. Sci., 48, 1439 (1962); Proc. Nat. Acad. Sci., 49, 230 (1963), and Science, 140, 1391 (1963), which are incorporated by reference in this application.

It is one of the objects of the present invention to provide methods for the extraction and isolation of growth influencing fractions from animal tissues, glands and fluids.

Another object is to provide an animal extract which may be further fractionated into a cancer growth inhibiting fraction which we have named retine and a cancer growth promoting fraction which we have named promine.

Another object is to provide methods of influencing cancer growth in animals including inhibiting such growth.

Further objects and advantages will be apparent from the detailed description and discussion of the invention which follows.

The biologically active fractions may be isolated from animal tissue, such as muscle, blood vessels and tendon and from glands such as thymus, and from urine.

The extraction procedure when utilizing solid materials involves a preliminary extraction of the starting material with boiling methanol, ethanol, acetone or the like, low temperature evaporation of the solution, acidification, and extraction of the active material with chloroform. The two fractions, retine and promine, may be separated chromatographically utilizing 1 N HCl-saturated butanol as the elutant.

When urine is employed as the starting material, it is first vacuum evaporated to about one tenth original volume, acidified, and shaken out with chloroform. Fatty material may be removed from an alkaline aqueous solution with benzene or other hydrocarbon solvent. Fractionation to separate retine from promine may be accomplished chromatographically as before.

Both retine and promine are precipitated by such reagents as phosphotungstic acid or ammonium Reinecke salt. The materials are soluble in chloroform, methanol, water and peanut oil. Utilizing ascending paper chromatography (Whatman 3) and 1 N HCl-saturated butanol elutant, promine exhibits an $Rf$ of 0.0 to 0.05 and retine an $Rf$ of 0.18 to 0.25. Retine decomposes at room temperature in about a week but is stable if stored at $-20°$ C. It is soluble in aqueous alkali solutions. Promine is soluble in acidic aqueous solutions as well as alkaline aqueous solutions.

The cancer growth inhibiting properties of retine have been demonstrated in mice against the spontaneous mammary tumor of C3H mice, Krebs 2 ascites tumor and sarcoma 180. The material may be injected dissolved in neutral aqueous solution or in peanut oil. We have characterized as a retine unit that amount which inhibits growth in mice by 50 percent and corresponds to about 50 to 80 micrograms, depending in the purity. Four units injected daily completely inhibit growth and causes retrogression.

Promine promotes cancer growth. Additionally, at least a fraction thereof induces sterility in both male and female mice. We have characterized as a promine unit that amount required to produce sterility in females. Two promine units administered daily increases the tumor weight two to three times but does not appear to induce malignancy. It appears that upon discontinuing the treatment, the animals regain fertility.

*Example I*

Eighty lbs. of hog's aorta, frozen soon after slaughter, were reduced to snow and dropped into 100 l. methanol. The methanol was brought to boiling, cooled to room temperature, solid matter separated by centrifugation, and the liquid phase clarified on a Sharples.

The methanol solution was vacuum concentrated at low temperature to 4 liters, the pH brought to pH 1 with 1 N HCl and shaken out 3 times with 500 ml. of 50/50 chloroform-ethanol by volume.

The chloroform-ethanol extracts were combined, the pH adjusted to pH 3 with 1 N NaOH, and reduced to dryness in vacuo at room temperature. The residue was dissolved in 300 ml. methanol, and the insolubles, chiefly NaCl, were discarded.

The methanol solution was concentrated in vacuo to 50 ml., placed on Whatman 3 paper and dried. The paper was exposed to saturated water vapor for ten minutes and ascending paper chromatography employed, utilizing n-butanol saturated with 1 N HCl as the moving phase. The paper was dried and cut up. The paper at $Rf$ 0.0 to 0.05 was extracted with methanol, yielding promine, and the paper at $Rf$ 0.18 to 0.25 extracted with methanol containing 10 percent by volume of 1 N HCl, yielding retine. The two solutions were dried in vacuo and the residues disolved in peanut oil.

In one test, Krebs 2 ascites tumor was used. A group of 6-8 week old mice were injected subcutaneously with 0.25 ml. of the cell containing ascites behind the scapula. In two days a palpable tumor developed. Four days later, injections of retine in 0.25 ml. peanut oil, containing 4 units (300 micrograms) were started in one group of mice and continued daily for 10 days. The injection was made subcutaneously on the opposite side from the tumor. In a control group 0.25 ml. of peanut oil alone was similarly injected daily for 10 days. The animals were sacrificed, the tumors excised and weighed. The following sets forth the results:

Average weight of tumor in control animals—$1050 \pm 150$ mg.

Average weight of tumor in animals receiving 4 units retine daily—$255 \pm 30$ mg.

Corresponding results were obtained with the spontaneous mammary tumor of C3H mice of Bar Barbor and sarcoma 180.

*Example II*

One hundred liters of men's urine was vacuum evaporated to 10 liters volume. The pH was adjusted to pH 1.0 with HCl. The solution was shaken out 3 times with 1 liter of chloroform, the chloroform extract combined and filtered through celite. The solution was then shaken with 100 ml. 0.1 N NaOH, the aqueous fraction acidified to pH 1 with HCl, and shaken out with 100 ml. benzene to remove fatty materials and the benzene fraction discarded. The watery solution was cooled in an ice bath and extracted three times with 40 ml. of chloroform, the chloroform solution combined and evaporated to dryness in vacuo. Paper chromatography was performed as in Example I yielding 40 mg. of retine containing about 600 units.

Four units of retine injected daily in 0.25 ml. water into mice afflicted with Krebs 2 ascites, sarcoma 180 and the tumor of C3H mice produced equivalent results to those of Example II. The control tumor afflicted mice in these tests were injected, subcutaneously as in Example I, with 0.25 ml. saline.

Promine isolated as in Example I promotes tumor growth in mice whereby the tumors grow two to three times as fast upon administration of 2 units daily in water or peanut oil solution as compared to the control animals.

Various equivalent extraction and isolation procedures are given in the publications mentioned above. Thus, calf thymus glands, upon extraction with methanol, ethanol or acetone, with or without barium hydroxide precipitation, and subsequent fractionation with chloroform, dichlorophenol and/or ammonium Reinecke salt yield an extract which may be fractionated chromatographically to yield retine and promine. Further, cellulose column chromatography may be employed. It will be understood that the $R_f$ fractions in paper chromatography will vary depending on the paper used and the elutant composition. Similarly, extraction of muscle and tendon yielded promine and retine extracts of comparable activity. Generally, the chloroform or equivalent extraction from alcoholic or aqueous fractions is accomplished at pH 1–4. In alkaline solution (0.1 N NaOH), the extracts are preferentially water soluble. Thus an efficient fractionation procedure utilizing aqueous and nonaqueous phases is afforded, whereby inactive materials may be separated.

While the invention has been described in terms of certain examples, they are to be considered illustrative rather than limiting, and it is intended to cover all modifications and embodiments which fall within the spirit and scope of the appended claims.

We claim:
1. The process of obtaining a biologically active extract inhibiting cancer growth in animals which comprises extracting animal matter selected from the group consisting of muscle, blood vessels, glands and urine with a solvent selected from the group consisting of water, lower alkanols and acetone, separating insolubles, acidifying the resultant extract to a pH in the range of 1 to 4, extracting the acidified solution with chloroform, recovering the chloroform-soluble fraction, dissolving said chloroform-soluble fraction in a lower alkanol, subjecting the alkanol solution to chromatographic fractionation and recovering the active extract from the moving elutant portion of said fractionation.

2. The product produced by the process of claim 1.

References Cited by the Examiner

Lloyd: The Pharmaceutical Journal, vol. 142, page 565, June 3, 1939.

McJunkin et al.: Chemical Abstracts, vol. 27, p. 5795.

JULIAN S. LEVITT, *Primary Examiner.*

L. B. RANDALL, *Assistant Examiner.*